United States Patent
Borkenhagen

(10) Patent No.: US 7,984,240 B2
(45) Date of Patent: Jul. 19, 2011

(54) MEMORY COMPRESSION IMPLEMENTATION IN A SYSTEM WITH DIRECTLY ATTACHED PROCESSOR MEMORY

(75) Inventor: John M. Borkenhagen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 457 days.

(21) Appl. No.: 12/041,863

(22) Filed: Mar. 4, 2008

(65) Prior Publication Data

US 2009/0228664 A1    Sep. 10, 2009

(51) Int. Cl.
*G06F 12/16* (2006.01)
(52) U.S. Cl. ........................ 711/118
(58) Field of Classification Search .......... None
See application file for complete search history.

(56) References Cited

U.S. PATENT DOCUMENTS

| | | | |
|---|---|---|---|
| 5,555,392 A * | 9/1996 | Chaput et al. | 711/118 |
| 5,812,817 A | 9/1998 | Hovis | |
| 6,658,549 B2 | 12/2003 | Wilson | |
| 6,681,305 B1 | 1/2004 | Franke et al. | |
| 6,766,429 B1 | 7/2004 | Bland et al. | |
| 6,775,751 B2 | 8/2004 | Tremaine | |
| 6,944,740 B2 | 9/2005 | Abali et al. | |
| 6,956,507 B2 | 10/2005 | Castelli et al. | |
| 6,961,821 B2 * | 11/2005 | Robinson | 711/133 |
| 6,968,424 B1 | 11/2005 | Danilak | |
| 7,302,543 B2 * | 11/2007 | Lekatsas et al. | 711/170 |
| 7,360,024 B2 | 4/2008 | Hironaka et al. | |
| 7,636,810 B2 * | 12/2009 | Ramakrishnan | 711/118 |
| 2001/0001872 A1 * | 5/2001 | Singh et al. | 711/129 |
| 2006/0069879 A1 * | 3/2006 | Inoue et al. | 711/147 |
| 2006/0101206 A1 | 5/2006 | Wood et al. | |
| 2008/0022048 A1 * | 1/2008 | Baker | 711/130 |

OTHER PUBLICATIONS

IBM Memory Expansion Technology (MXT) Datasheet [online]. International Business Machines Corporation, 2000 [retrieved on Feb. 13, 2008]. Retrieved from the Internet: <URL: http://www.research.ibm.com/journal/rd/452/tremaine.html>.

* cited by examiner

*Primary Examiner* — Duc T Doan
(74) *Attorney, Agent, or Firm* — Toler Law Group

(57) ABSTRACT

A method, apparatus and program product enable memory compression for a system including processor with directly attached memory. A memory expander microchip facilitates memory compression while attached to a processor. The memory expander microchip may provide additional bandwidth and memory capacity for the system to enable memory compression in a manner that does not burden the attached processor or associated operating system. The processor may store uncompressed data in its lower latency, directly attached memory, while the memory attached to the memory expander may store either or both compressed and uncompressed data.

25 Claims, 3 Drawing Sheets

MEMORY COMPRESSION IMPLEMENTATION IN A SYSTEM WITH DIRECTLY ATTACHED PROCESSOR MEMORY

RELATED APPLICATIONS

The present application relates to co-pending U.S. patent applications, entitled "Associativity Implementation in a System with Directly Attached Processor Memory" Ser. No. 12/041,894 and "Memory Compression Implementation in a Multi-Node Server System with Directly Attached Processor Memory" Ser. No. 12/041,911, both by the present inventor, John M. Borkenhagen, both of which are filed concurrently herewith, and which are incorporated by reference in their entireties.

FIELD OF THE INVENTION

The present invention generally relates to computer memory architecture, and in particular, to an architecture for managing memory compression.

BACKGROUND OF THE INVENTION

The need for increased memory and processing capability continues to drive advances in central processing units (CPUs) and associated memory devices. A CPU typically includes a die, or microchips, which contain multiple processing units, communications hardware, and a local networking or communications bus. The core logic chipsets (cores) are the components that make up the processor die. The cores comprise the central processing logic of a computing system. A system's core logic typically includes a controller for handling memory functions, a cache for storing instructions, the logic for bus interfaces, and the functions of data paths. A single die can contain hundreds of processor cores. In increasing the number of cores, computer performance also increases, as does the need for more memory. For efficiency considerations, the memory-to-processor core ratio must stay relatively constant. That is, as more processors are added, memory must be proportionally added.

The need for higher memory to processor-core ratios is further driven by advances in virtualization. Virtualization makes it possible to run multiple operating systems and multiple applications on the same computer at the same time, increasing the utilization and flexibility of hardware. In one respect, virtualization allows the transformation of hardware into software, including the CPU, RAM, hard disk and network controller, to create a fully functional virtual machine that can run its own operating system and applications just like a physical computer. Virtualization is advantageous because it allows for server consolidation and increased processor accessibility. Thus, virtualization is driving the need for even higher memory to processor-core ratios, and higher memory capacity on servers.

The increased processing afforded by virtualization requires the addition of memory to maintain the required ratio. For speed considerations, the preferred way to add memory is to attach main memory directly to the processor. Performance is increased with data being stored directly in main memory, as opposed to slower, remote memory, e.g., memory on a disk. However, attaching memory directly to the processor typically imposes a limitation on the total amount of available memory. Attached memory may be inadequate for applications requiring larger memory capacities.

Memory compression is sometimes used to optimize available memory. Using compression, data may be encoded (represented as symbols) to take up less space. Memory compression effectively expands memory capacity up to two or more times for some applications without increasing actual physical memory and associated expenses. Despite its benefits, however, memory compression typically requires more memory bandwidth than is available in conventional attached memory, as well as compression logic.

Memory compression is often measured in terms of its associated compression ratio. The compression ratio is the quotient of memory space required by uncompressed data relative to the smaller amount of memory space required by compressed data. As data changes in main memory, the compression ratio can also change. When the compression ratio decreases, more physical memory is required. As a result, some physical memory must be vacated to accommodate changing data having a small compression ratio. This practice requires interaction with the operating system, taxing overall system processes. It can prove difficult to obtain the needed support from the operating systems to efficiently accomplish memory compression.

As discussed herein, many processors (and particularly, those having directly attached memory) are unequipped to perform memory compression. For instance, many such processors do not have adequate bandwidth or memory compression logic. The industry standard x86 processor is one example of a processor that does not support memory compression. As a result, users are relegated to finding alternative and less efficient ways to provide for more memory.

What is needed is a more efficient and cost effective way of providing additional memory bandwidth for systems using processors that do not support compression on memory directly attached to the processor.

SUMMARY OF THE INVENTION

The present invention provides an improved computer implemented method, apparatus and program product for accomplishing memory compression in a system having a processor with directly attached memory. Aspects of the invention may include first and second memories. In one embodiment, the first memory may include uncompressed data, and the second memory may include compressed data. A processor directly attaches to the first memory, and memory expander logic resident on a microchip may communicate with both the processor and the second memory. The memory expander logic may provide needed bandwidth and logic to implement operations involving the compressed data.

According to one embodiment that is consistent with the invention, the memory expander logic may include a compressed data cache. Another or the same embodiment may have the memory expander logic include a compressed data cache and/or compressed data. Where so configured, the memory expander microchip may include a compression/decompression engine. In one aspect, the memory expander logic may comprise circuitry configured to implement memory read and write commands generated by and communicated from the processor.

According to another aspect of the invention, the second memory may include a data cache. The second memory typically includes uncompressed data, and may additionally include a compressed data cache.

Another embodiment consistent with the invention may include a memory buffer positioned between the memory expander logic and the second memory, the memory buffer configured to facilitate data compression. The processor may be configured to generate memory read and write commands for implementation by the memory expander logic. The processor may further be configured to manage operations involving the uncompressed data.

According to another aspect of the invention, more frequently used data is stored in the first memory. Less frequently used data may be stored in the second memory.

An embodiment of the invention may include circuitry in communication with both a memory and a processor having directly attached memory, the circuitry configured to implement memory read and write commands generated by and communicated from the processor to facilitate memory compression.

Another aspect of the invention may manage compressed memory data by, in part, attaching a memory directly to a processor, compressing data and storing the compressed data in at least one of the directly attached memory or another memory.

Where so desired, frequently used data may be stored in the first memory, as may be uncompressed data. Infrequently used data may be stored in the second memory. Similarly, compressed data of the same or another embodiment may be stored in the second memory. According to another aspect of the invention, uncompressed data may be stored in the second memory.

Another embodiment consistent with the invention may manage compressed memory data by attaching a first memory directly to a processor, and attaching to the processor a memory expander microchip having access to a second memory and configured to implement memory compression operations, and then may perform a memory compression operation on data.

An aspect of the invention also includes a program product comprising program code in communication with a processor and configured to implement memory compression in a system comprising a main memory directly attached to the processor, and a computer readable medium bearing the program code.

These and other advantages and features that characterize the invention are set forth in the claims annexed hereto and forming a further part hereof. However, for a better understanding of the invention, and of the advantages and objectives attained through its use, reference should be made to the Drawings and to the accompanying descriptive matter in that there are described exemplary embodiments of the invention.

DETAILED DESCRIPTION

Embodiments consistent with the underlying principles of the present invention may include processes for enabling memory compression in association with a processor having directly attached memory. A memory expander microchip facilitates memory compression while attached to a processor. The memory expander microchip may provide additional bandwidth and memory capacity for the system to enable memory compression in a manner that does not burden the attached processor or associated operating system. The processor may store uncompressed data in its lower latency, directly attached memory, while the memory attached to the memory expander may store either or both compressed and uncompressed data.

The memory expander microchip may comprise memory control logic, typically on a silicon microchip, which implements memory read and write commands generated by and communicated from a processor. As such, the memory expander microchip may not execute program instructions like a processor, but rather, facilitates memory read and write commands generated to enable increased capacity. A memory expander microchip may include its own memory control logic, and may be attached directly to dual inline memory modules (DIMMs). DIMMs are small circuit boards that hold memory chips. In some embodiments, the memory expander microchip may include input/output (I/O) capability.

According to one aspect of invention, a hypervisor or an operating system may address map the most frequently used memory to an uncompressed main store that is directly attached to the processor. Longer latency memory on the memory expander microchip may be used for memory compression. Less frequently used memory may be mapped into a memory range of the memory expander microchip that holds the compressed data.

As such, embodiments consistent with the underlying principles of the present invention may allow a single entity to manage memory comprising both compressed and uncompressed data.

Memory compression on the memory expander microchip may or may not have an uncompressed data cache. The uncompressed data cache may exist on the memory expander microchip or may be mapped into the memory on the DIMMs attached to the memory expander microchip. In this manner, memory compression may be hidden from the processor.

In addition to supporting the possibility for an uncompressed data cache mapped to the DIMMs, the memory expander microchip may provide the option of having a range of normal uncompressed memory in the DIMMs attached to it, with or without the uncompressed data cache.

The memory compression feature may be optionally disabled for applications that do not benefit from memory compression. In this case, the memory attached to the memory expander microchip may act as uncompressed memory.

Figure 1:
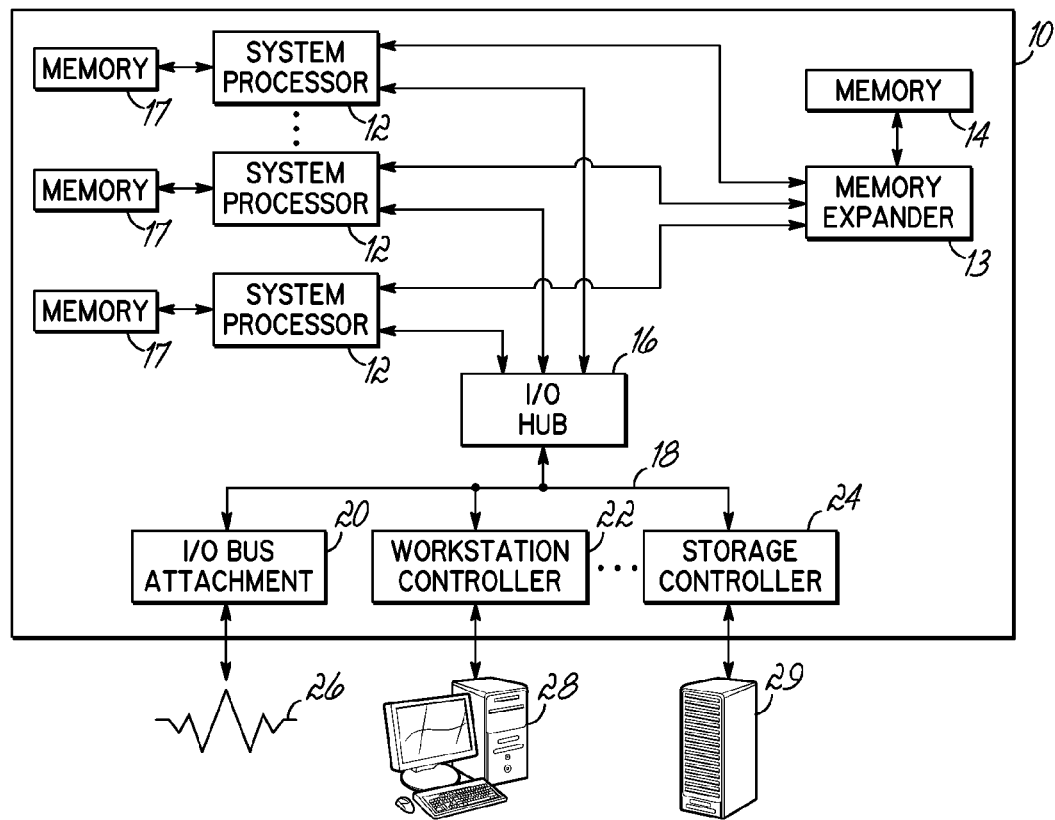
FIG. 1 is a block diagram of a computer system configured to manage memory compression using a memory expander microchip attached to a processor having directly attached memory in accordance with the principles of the present invention.

Turning more particularly to the drawings, FIG. 1 illustrates a data processing apparatus 10 consistent with the invention. Apparatus 10 generically represents, for example, any of a number of multi-user computer systems such as a network server, a midrange computer, a mainframe computer, etc. However, it should be appreciated that the invention may be implemented in another data processing apparatus, e.g., in stand-alone or single-user computer systems such as workstations, desktop computers, portable computers, and the like, or in other computing devices such as embedded controllers, and the like. One suitable implementation of apparatus 10 may be a multi-user computer, such as the Series i computer available from International Business Machines Corporation (IBM).

Apparatus 10 generally includes one or more physical processors 12 coupled to an input/output (I/O) hub 16. Each processor 12 may directly and respectively attach to memory 17, e.g., an array of DIMMs. Where desired, the physical processors 12 and/or environment may be multithreaded. Multithreading enables different portions of program code to execute concurrently. Also illustrated as in communication with processors 12 is a memory expander microchip 13. The memory expander microchip is typically in communication with additional memory 14.

I/O hub 16 may further couple to a number of types of external I/O devices via a system bus 18 and a plurality of interface devices. Exemplary I/O devices include a bus attachment interface 20, a workstation controller 22 and a storage controller 24. Such I/O devices may respectively provide external access to one or more external networks 26, one or more workstations 28, and/or one or more storage devices such as a direct access storage device (DASD) 29.

Figure 2:
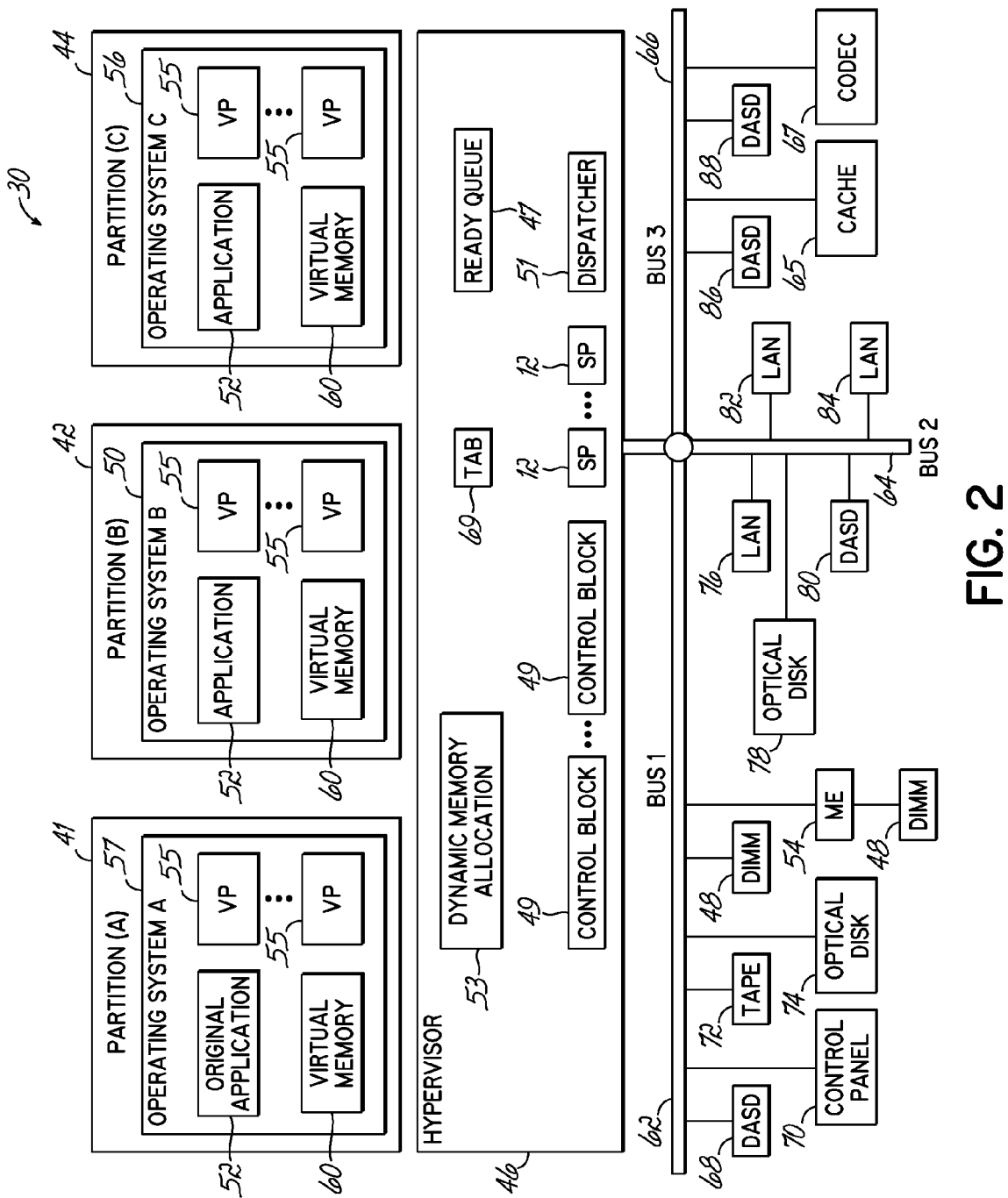
FIG. 2 is a block diagram of primary software components and resources consistent with the computer system of FIG. 1.

FIG. 2 illustrates in greater detail the primary software components and resources used to implement a logically partitioned environment consistent with the apparatus 10 of FIG. 1. FIG. 2 generally shows a computing architecture characterized as a virtual machine design developed by IBM. The system 30 includes a plurality of partitions 41, 42, 44 that share common processing resources among multiple processes. Such an architecture may rely upon a single computing machine having one or more physical processors/CPUs 12. The CPUs 12 may execute software configured to simulate multiple virtual processors 55.

The partitions 41, 42, 44 may logically comprise a portion of a system's physical CPUs 12, DASD 68, and other resources as assigned by an administrator. Each partition 41, 42, 44 typically hosts an operating system 50, 56, 57 and may have multiple virtual processors 55. In this manner, each partition 41, 42, 44 operates largely as if it is a separate computer. As shown in FIG. 2, the production environment comprising each partition 41, 42, 44 may also include program code, such as the applications 52 shown in FIG. 2.

An underlying program called a hypervisor 46, or partition manager, may use this scheme to assign physical resources to each partition 41, 42, 44. In virtualization technology, the hypervisor 46 may manage the operating systems 50, 56, 57 (or multiple instances of the same operating system) on a single computer system. The hypervisor 46 may manage the system's processor, memory, and other resources to allocate what each operating system 50, 56, 57 requires. For instance, the hypervisor 46 may intercept requests for resources from operating systems 50, 56, 57 to globally share and allocate resources. If the partitions 41, 42 and 44 are sharing processors, the hypervisor 46 may allocate physical processor cycles between the virtual processors 55 of the partitions 41, 42, 44 sharing the CPU 12.

In the context of memory compression, the hypervisor 46 may accomplish additionally required data retrieval management. Significantly, such data retrieval may be accomplished in at least one embodiment without exploiting the CPU processing cycles of the operating systems 50, 56, 57. Where desired, the hypervisor 46 may include a dynamic memory allocation program 53 configured to dynamically allocate memory. The dynamic memory allocation program 53 may dynamically allocate a different ratio of memory channels based on the compression cache hit ratio, for instance. As compressed data memory is reduced, the hypervisor 46 may reduce the number of available memory pages in the main store 17. As compressed data memory is increased, the hypervisor 46 may increase the number of available memory pages in main store 17.

Each operating system 50, 56, 57 controls the primary operations of its respective logical partition 41, 42, 44 in the same manner as the operating system of a non-partitioned computer. Each logical partition 41, 42, 44 may execute in a separate memory space, represented by virtual memory 60. Moreover, each logical partition 41, 42, 44 is statically and/or dynamically allocated a portion of the available resources in system 30. For example, and as discussed herein, each logical partition may share one or more physical CPUs 12, as well as a portion of the available memory space for use in virtual memory 60. In this manner, a given physical CPU 12 may be utilized by more than one logical partition 41, 42, 44.

The hypervisor 46 may include a dispatcher 51 that manages the dispatching of virtual processors to physical processors on a dispatch list or ready queue 47. The ready queue 47 comprises memory that includes a list of virtual processors having work that is waiting to be dispatched on a physical processor 12. The hypervisor 46 shown in FIG. 2 also controls physical CPUs 12, and may additionally control memory expanders 54 and DIMMs 14. Processor control blocks 49 of the hypervisor 46 comprise memory that includes a list of virtual processors waiting for access on a particular physical processor 12.

Additional resources, e.g., mass storage, backup storage, user input, network connections, and the like, are typically allocated to one or more logical partitions in a manner well known in the art. Resources can be allocated in a number of manners, e.g., on a bus-by-bus basis, or on a resource-by-resource basis, with multiple logical partitions sharing resources on the same bus. Some resources may even be allocated to multiple logical partitions at a time. FIG. 2 illustrates, for example, three logical buses 62, 64 and 66, with a plurality of resources on bus 62, including a direct access storage device (DASD) 68, a control panel 70, a tape drive 72 and an optical disk drive 74, allocated to a partition.

Bus 64, on the other hand, may have resources allocated on a resource-by-resource basis, e.g., with local area network (LAN) adaptor 76, optical disk drive 78 and DASD 80 allocated to logical partition 42, and LAN adaptors 82 and 84 allocated to logical partition 44. Bus 66 may represent, for example, a bus allocated specifically to logical partition 44, such that all resources on the bus, e.g., DASD's 86 and 88, are allocated to the same logical partition.

The hardware shown in FIG. 2 optionally comprises one or more caches 65, a compression/decompression engine (CODEC) 67, memory expanders (ME) 54 and compressed storage in the DIMMs 48.

Within the compressed storage in the DIMMs 14, 48 and/or other memory, the system 30 may include compressed and uncompressed memory. It will be understood by one skilled in the art that the distinction between compressed and uncompressed memory may be a logical one in that both may exist in the same physical storage, for example, the same memory array. Uncompressed memory may comprise memory containing uncompressed data. In a similar fashion, compressed memory may be defined as memory containing compressed data. The data in virtual memory may reside in memory. Main store 17 may include either or both uncompressed and compressed data. One skilled in the art will appreciate that other embodiments consistent with the invention may be realized by executing the above programs in an operating system 50, 56, 57 in addition or as opposed to in the hypervisor 46.

It will be appreciated that the illustration of specific resources in FIG. 2 is merely exemplary in nature, and that any combination and arrangement of resources may be allocated to any logical partition in the alternative. For instance, it will be appreciated by one of skill in the art that in some implementations resources can be reallocated on a dynamic basis to service the needs of other logical partitions. Furthermore, it will be appreciated that resources may also be represented in terms of the I/O processors used to interface the computer with the specific hardware devices.

The various software components and resources illustrated in FIG. 2 may be implemented in a number of manners, including using various computer software applications, routines, components, programs, objects, modules, data structures, etc., referred to hereinafter as computer programs, tools, programs or program code. Program code typically comprises one or more instructions that are resident at various times in various memory and storage devices in the computer, and that, when read and executed by one or more processors in the computer, cause that computer to perform the steps necessary to execute steps or elements embodying the various aspects of the invention.

Moreover, while the invention has and hereinafter will be described in the context of fully functioning computers, those skilled in the art will appreciate that the various embodiments of the invention are capable of being distributed as a program product in a variety of forms, and that the invention applies equally regardless of the particular type of computer readable medium used to actually carry out the distribution. Examples of computer readable media include, but are not limited to tangible, recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environments illustrated in FIGS. 1 and 2 are not intended to limit the present invention. Though not shown in FIG. 2, for instance, one skilled in the art will appreciate that other partitions may be included within other embodiments, including a partition that comprises part of the hypervisor 46. This hypervisor partition functions in many ways like the conventional partitions 41, 42 and 44 (and operating systems), but has no user interface for the customer to protect it from failures that might otherwise come about through user interaction. Furthermore, while three logical partitions 41, 42 and 44 are shown in FIG. 2, one skilled in the art will appreciate that more or fewer partitions may be implemented as needed. Other alternative hardware and/or software environments may thus be used without departing from the scope of the invention.

Figure 3:
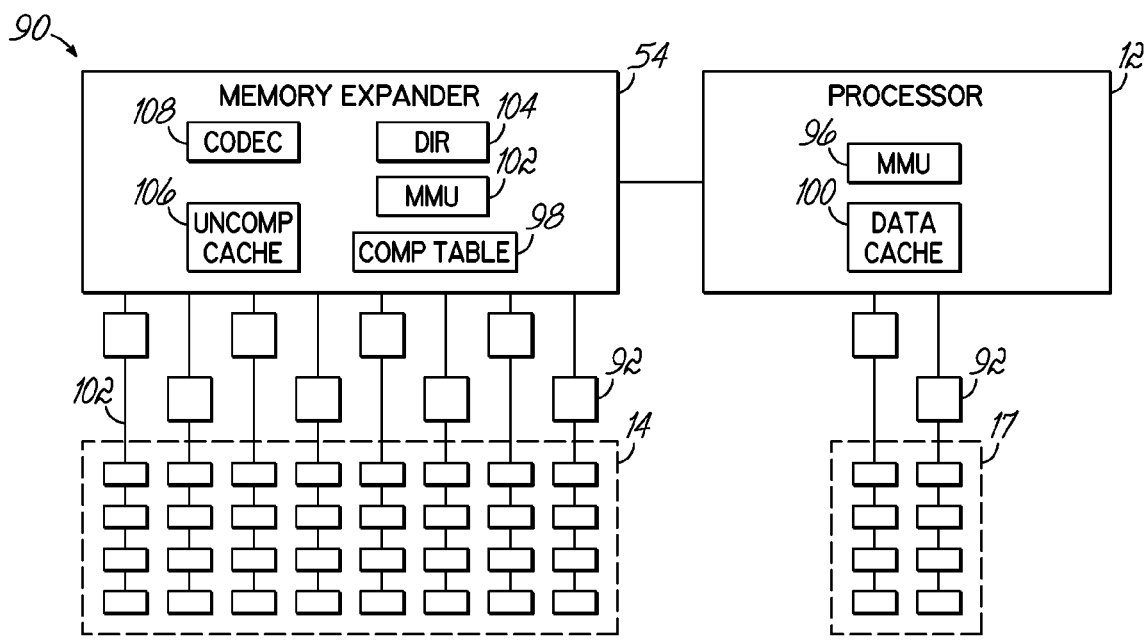
FIG. 3 shows a system including a processor having both a directly attached memory and a memory expander microchip in accordance with aspects of the present invention.

FIG. 3 shows a system 90 having a CPU/processor 12 having both a directly attached memory DIMMS 17 and a directly attached memory expander 54. More particularly, the system 90 includes a physical processor 12 directly attached to DIMMs 17 and having compressed storage in the DIMMs 14 attached to the memory expander 54. As shown in FIG. 3, the processor 12 also attaches to the memory expander 54. The processor 12 connects directly to the DIMMs 17 via memory buffer microchips 92. As shown in FIG. 3, the processor 12 includes a memory management unit (MMU) 96. The processor 12 may also include a data cache 100. In one embodiment, the data cache 100 may be associated with uncompressed data in DIMMs 14, 17. The DIMMs 17 are directly attached in that they may be proximate to and/or in uninterrupted communication with the processor, as opposed to remote memory, e.g., on a disk.

The memory expander 54 of FIG. 3 may connect directly to storage in the DIMMs 14, which typically includes compressed data. More particularly, the embodiment uses a direct connection including the memory channels 102 and memory buffer microchips 92. In another embodiment, the memory expander microchip 54 may merely be in communication with DIMMs 14. As such, the memory expander microchip 54 need not be attached directly to the DIMMs 14.

The memory expander microchip 54 includes a MMU 101, a compressed cache directory 104, a compressed data table 98 and a data cache 106. The data cache 106 may include uncompressed and cached data associated with either uncompressed or compressed data stored in memory 14, 17. The MMU 101 may programmatically implement compression/decompression and other memory functions. For this purpose, the memory expander microchip 54 may also include a CODEC 108. As discussed herein, embodiments consistent with the invention allow the MMU 101 to implement and otherwise manage such memory functions without burdening the CPU 12 or hypervisor 46.

While the data cache 106 is shown as being on the memory expander 54 in FIG. 3, another embodiment may position the data cache 106 within the DIMMs 14. In another or the same embodiment, memory compression logic, such as comprises the MMU 101, may be inserted on memory buffer microchips 92 and/or on each memory channel 102 between the physical processor 12 and the compressed storage in the DIMMs 14. Where desired, any of the compressed data table 98, compressed data directory 104, data cache 106 and MMU 101 may be positioned within the DIMMs 14 or a memory channel 102.

Each memory channel 102 may function to deliver data from one point to another. The memory channels 102 may comprise one or more of the following components: format conversion devices, encoders (compressors) and decoders (decompressors), buffers, stream segmentation and reassembly devices, multiplexors and demultiplexors, modulators and demodulators, transmission facilities, switches, multipoint conference units, and other components necessary to achieve the desired channel characteristics. For purposes of this specification, memory channels may include memory. A sequence of data bits submitted to the channel input results in a similar (not necessarily identical) sequence of bits at the channel output.

In order to improve performance, the data cache 100 typically has a fast access time. Within the general scheme of processor memory accesses, most memory accesses fall within a small range of the total available memory storage. A memory architecture according to embodiments of the present invention may be used with a most recently used control scheme to maintain the most active segments of memory within the data cache 106. The function of the cache directory 104 may be to determine if the memory access is in data cache 106 or not, and if it is in data cache 106, to provide the address in physical memory where the data resides.

A function of the compressed data table 98 is to provide a listing for the memory locations that are in the compressed storage in the DIMMs 14. When an access to the memory misses the uncompressed data cache 106, it generates an access to the compressed data table 98. The data from this access contains the location of the data within compressed storage in the DIMMs 14. The address results in an access to the compressed storage in the DIMMs 14, which in turn may result in compressed data being accessed and processed by the CODEC 108. The CODEC 108 may perform compression and decompression on the data. The resultant uncompressed data may be placed in the data cache 100, 106 and transferred to the requesting element (for a fetch), or updated and maintained within the data cache 100, 106 for a store.

The compressed storage in the DIMMs 14 may physically be relatively larger than the DIMMs 17. It may contain the compressed data (which is variable in length) and is stored into a variable number of frames. These frames may be inherently smaller than the data block size that is being compressed.

Figure 4:
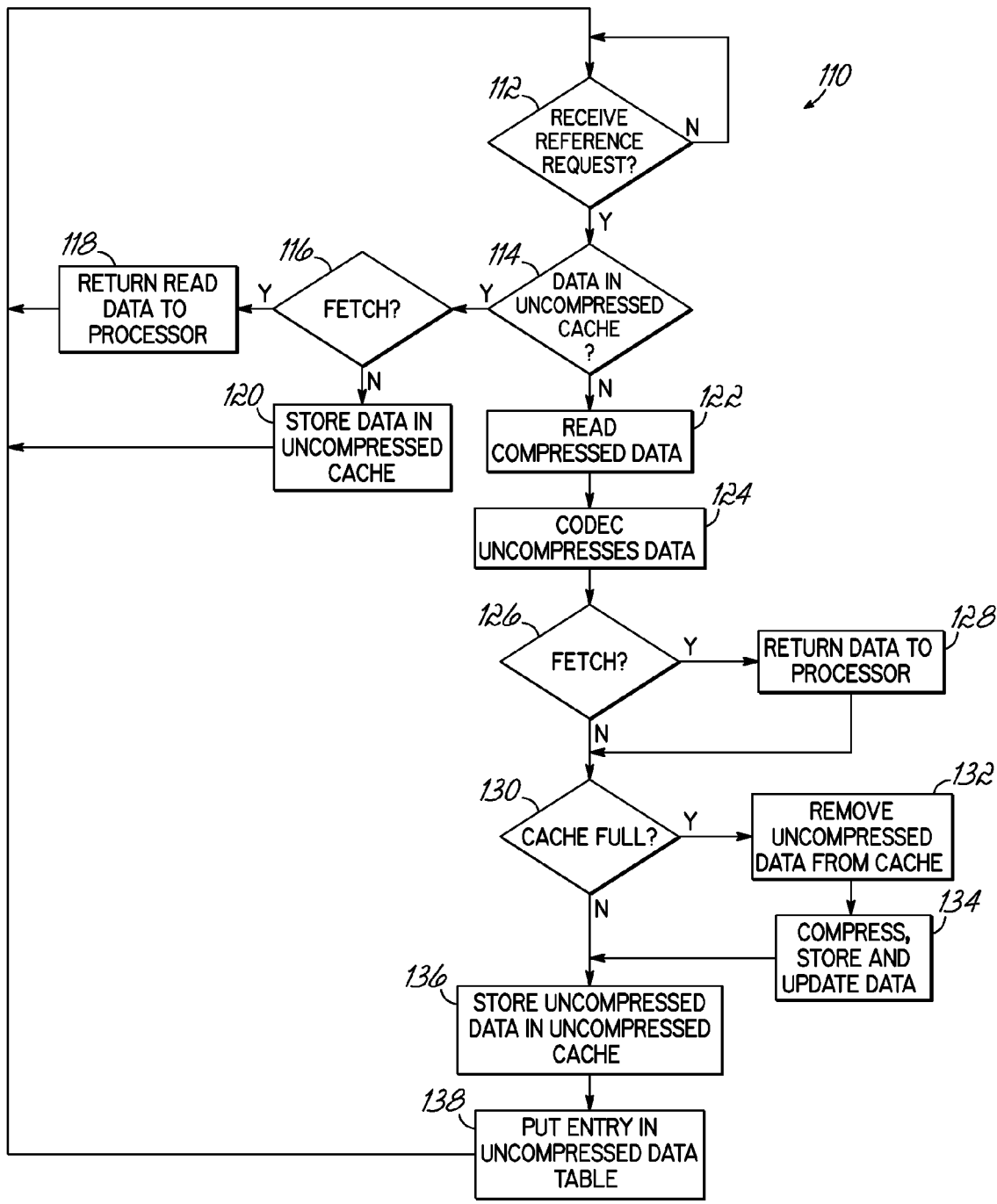
FIG. 4 is a flowchart showing examples of read and write operations executable by the system of FIG. 3 in a manner that is consistent with aspects of the present invention.

FIG. 4 is a flowchart 110 showing examples of read and write operations in an embodiment using a memory architecture consistent with aspects of the present invention. The system 30 receives at block 112 a memory reference request and determines at block 114 if the data is in the data cache directory 104. If the data is in the data cache directory 104, the system 30 then may check at block 116 whether the command was a fetch or store. If it was a fetch, the system 30 may then retrieve at block 118 the data and transmit it to the physical processor 12 or other requesting unit. If the command was a store at block 120, the data may be stored in the data cache 106.

If the data is otherwise in the compressed storage in the DIMMs 14, the system 30 may initiate a read of the compressed data at block 122. The CODEC 108 may uncompress the data at block 124.

The system 90 may determine at block 126 if the request is a fetch. If so, then the data may be returned to the processor 12 at block 128.

If the request is alternatively to store data, then the system 90 may determine at block 130 if the data cache 106 is full. If the data cache 106 is full, then the system 90 may initiate at block 134 a cast out operation. That is, the system 90 may remove at block 132 the least recently used data element in the data cache 106 to the compressed storage in the DIMMs 14. Accordingly, the data may be sent to the CODEC 108 for compressing at block 134. The system 90 may additionally store the data compressed data in the compressed memory/DIMMs 14, and update the data element in the compressed data table 98.

Where the uncompressed data cache is not full at block 130, the system 90 may store at block 136 the uncompressed data in the data cache 106 (along with any store updates). The system 90 may place an entry in the compressed data table 98, as appropriate. Where the data cache 106 is held in storage with the uncompressed data on main memory, a read may result in a retrieval of the data along with bits indicative of an address of cache. Where different components are not collocated, multiple reads may be needed.

In one embodiment, the system 90 may determine and appropriately store data according to its frequency of use. Namely, most frequently used data may be stored in DIMMs 17 directly attached to the physical processor 12. Less frequently used data may be stored in compressed storage in the DIMMs 14 directly attached to the memory expander microchip 54. The system 90 may continually shift stored data by adding new data and transferring old data into the compressed storage in the DIMMs 14, which may occur as a background process. This is an example of a most recently used algorithm for writing data to memory. The flowchart 110 shown in FIG. 4 is only one example of read and write operations using the memory architecture of the present invention, other such operations are possible.

While the present invention has been illustrated by a description of various embodiments and while these embodiments have been described in considerable detail, it is not the intention of the Applicant to restrict, or in any way limit the scope of the appended claims to such detail. For instance, while memory compression logic is discussed herein as being present on a memory expander, other embodiments may insert memory compression logic on a buffer located on the memory channels that are positioned between the processor and the circuit boards that hold memory microchips, e.g., the DIMMs.

The invention in its broader aspects is therefore not limited to the specific details, representative apparatus and method, and illustrative example shown and described. For example, the memory attached to the memory expander may in some applications store an uncompressed data cache and/or uncompressed data for further processing advantages. Accordingly, departures may be made from such details without departing from the spirit or scope of Applicant's general inventive concept.

What is claimed is:

1. An apparatus comprising:
a first memory including a first memory address space;
a second memory including a second memory address space that is distinct from the first memory address space, wherein the second memory is operable to store data in the second memory address space in a compressed format and in an uncompressed format;
a processor directly coupled via a first connection to the first memory, wherein the processor includes a first cache and a first memory management unit, the first memory management unit configured to:
receive a first command from the processor that is associated with an operation involving the first memory; and
execute the first command to map first data in the first memory address space and not in the second memory address space;
a memory expander microchip coupled to the processor via a second connection and to the second memory via a third connection, the memory expander microchip including a second memory management unit configured to:
receive a second command from the processor that is associated with an operation involving the second memory, and wherein the second memory management unit is configured to execute the second command to map second data associated with the second command in the second memory address space.

2. The apparatus of claim 1, wherein the memory expander microchip includes a second data cache, and wherein the second memory management unit is configured to determine whether the second data associated with the second command received from the processor by the memory expander microchip is located within the second data cache.

3. The apparatus of claim 1, wherein the first memory is configured to store data in an uncompressed format.

4. The apparatus of claim 1, wherein the memory expander microchip includes a compression/decompression engine responsive to the second memory management unit to perform a compression operation associated with the second memory.

5. The apparatus of claim 1, wherein the second memory includes a data cache.

6. The apparatus of claim 5, wherein the data cache is associated with data stored in the compressed format.

7. The apparatus of claim 5, wherein the second memory management unit is configured to determine whether data is located in the data cache.

8. The apparatus of claim 1, wherein the second memory includes data stored in the uncompressed format.

9. The apparatus of claim 1, wherein the third connection includes a memory buffer, the memory buffer configured to perform a compression operation.

10. The apparatus of claim 1, wherein the processor is configured to generate the second command for implementation by the memory expander logic microchip via the second memory management unit.

11. The apparatus of claim 1, wherein the processor is configured to initiate operations involving data stored in the first memory via the first memory management unit.

12. The apparatus of claim 1, wherein the second memory management unit is further configured to store data in the second memory address space in the compressed format via a compression/decompression engine located at the memory expander microchip.

13. The apparatus of claim 1, wherein more frequently used data is stored in the first memory address space.

14. The apparatus of claim 1, wherein less frequently used data is stored in the second memory address space.

15. The apparatus of claim 1, further comprising:
a hypervisor communicatively coupled to the processor and to the second memory via the memory expander microchip, wherein the hypervisor manages a plurality of virtual machines that share the processor, and wherein managing the plurality of virtual machines includes:
allocating a first portion of the first memory to a first virtual machine based on a first amount of memory stored in the second memory in a compressed format that is associated with the first virtual machine, wherein allocating the first portion includes allocating a first set of memory addresses associated with the first memory address space; and
allocating a second portion of the memory to a second virtual machine based on a fourth amount of memory stored in the second memory in the compressed format that is associated with the second virtual machine, wherein allocating the second portion includes allocating a second set of memory addresses associated with the second memory address space.

16. The apparatus of claim 1, wherein the third connection comprises a plurality of memory channels configured to provide the memory expander microchip with access to the second memory address space.

17. The apparatus of claim 1, wherein a first memory channel of the plurality of memory channels is associated with data stored at the second memory in the compressed format, and wherein a second memory channel of the plurality of memory channels is associated with data stored at the second memory in the uncompressed format.

18. The apparatus of claim 17, wherein the memory expander microchip further includes a second cache, and wherein the second memory management unit dynamically allocates a different ratio of memory channels based on a compression cache hit ratio, the compression cache hit ratio associated with the second cache.

19. A method comprising:
directly coupling a processor via a first connection to a first memory including a first memory address space, the processor including a first cache and a first memory management unit, the first memory management unit configured to:
receive a first command from the processor that is associated with the first memory; and
execute the first command to map first data into the first memory address space and not into a second memory address space associated with a second memory that is distinct from the first memory;
directly coupling a memory expander microchip to the processor via a second connection and to the second memory via a third connection, the memory expander microchip including a second memory management unit, the second memory management unit configured to execute a second command that is associated with an operation involving the second memory;
receiving, at the memory expander microchip via the second connection, the second command;
in response to receiving the second command at the memory expander microchip, executing, via the second memory management unit, the second command to map the second data into the second memory address space.

20. The method of claim 19, further comprising storing frequently used data in the first memory address space.

21. The method of claim 19, further comprising storing infrequently used data in the second memory address space.

22. The method of claim 19, further comprising storing the second data in at least one of the compressed format and the uncompressed format in the second memory address space.

23. The method of claim 19, wherein the memory expander microchip includes a second cache.

24. The method of claim 23, wherein the third connection comprises a plurality of memory channels configured to provide the memory expander microchip with access to the second memory address space, wherein a first memory channel of the plurality of memory channels is associated with data stored at the second memory in the compressed format, and wherein a second memory channel of the plurality of memory channels is associated with data stored at the second memory in the uncompressed format.

25. The method of claim 24, further comprising dynamically allocating, via the second memory management unit, a different ratio of memory channels based on a compression cache hit ratio, the compression cache hit ratio associated with the second cache.

* * * * *